US006596388B1

United States Patent
Obeng et al.

(10) Patent No.: US 6,596,388 B1
(45) Date of Patent: Jul. 22, 2003

(54) METHOD OF INTRODUCING ORGANIC AND INORGANIC GRAFTED COMPOUNDS THROUGHOUT A THERMOPLASTIC POLISHING PAD USING A SUPERCRITICAL FLUID AND APPLICATIONS THEREFOR

(75) Inventors: Yaw S. Obeng, Orlando, FL (US); Edward M. Yokley, Pembroke Pines, FL (US)

(73) Assignee: PsiloQuest, Winter Park, FL (US)

( * ) Notice: Subject to any disclaimer, the term of this patent is extended or adjusted under 35 U.S.C. 154(b) by 0 days.

(21) Appl. No.: 09/998,471

(22) Filed: Nov. 29, 2001

Related U.S. Application Data

(60) Provisional application No. 60/250,299, filed on Nov. 29, 2000, provisional application No. 60/295,315, filed on Jun. 1, 2001, and provisional application No. 60/304,375, filed on Jul. 10, 2001.

(51) Int. Cl.$^7$ ................................................. B32B 3/26
(52) U.S. Cl. .................... 428/305.5; 428/304.4; 428/318.4; 428/319.3; 428/319.7; 428/319.9; 428/423.1; 428/425.8; 428/446; 428/447; 428/492; 428/500; 428/524; 451/548
(58) Field of Search .................. 428/304.4, 305.5, 428/318.4, 319.3, 319.7, 319.9, 423.1, 425.8, 446, 447, 492, 500, 524; 451/36, 548

(56) References Cited

U.S. PATENT DOCUMENTS

| | | | |
|---|---|---|---|
| 4,446,254 A | | 5/1984 | Nakae et al. |
| 4,613,345 A | | 9/1986 | Thicke et al. |
| 4,946,903 A | | 8/1990 | Gardella, Jr. et al. |
| 5,624,303 A | | 4/1997 | Robinson |
| 5,670,102 A | * | 9/1997 | Perman et al. ............. 264/50 |
| 5,945,486 A | | 8/1999 | Vargo et al. |
| 5,968,377 A | * | 10/1999 | Yuasa et al. ........... 219/121.41 |
| 5,993,917 A | * | 11/1999 | Pan et al. .................. 427/536 |
| 6,063,306 A | | 5/2000 | Kaufman et al. |
| 6,083,838 A | | 7/2000 | Burton et al. |
| 6,099,954 A | | 8/2000 | Urbanavage et al. |
| 6,132,298 A | | 10/2000 | Zuniga et al. |
| 6,150,271 A | | 11/2000 | Easter et al. |
| 6,231,942 B1 | | 5/2001 | Blizard et al. |
| 6,267,644 B1 | | 7/2001 | Molnar |
| 6,283,829 B1 | * | 9/2001 | Molnar ..................... 451/8 |
| 6,291,349 B1 | | 9/2001 | Molnar |
| 6,293,851 B1 | | 9/2001 | Molnar |
| 6,346,202 B1 | | 2/2002 | Molnar |
| 6,354,915 B1 | | 3/2002 | James et al. |
| 6,413,153 B1 | | 7/2002 | Molnar |
| 6,428,388 B2 | | 8/2002 | Molnar |
| 6,435,948 B1 | | 8/2002 | Molnar |

FOREIGN PATENT DOCUMENTS

| | | |
|---|---|---|
| EP | 01 064776 | 3/1989 |
| EP | 08 078369 | 3/1996 |
| EP | 0 884 349 A1 | 12/1998 |
| EP | 11 245164 | 9/1999 |
| GB | 1338647 | 11/1973 |
| JP | 9132661 | 5/1997 |
| WO | WO 99/10129 | 3/1999 |
| WO | WO 9962673 | 12/1999 |

* cited by examiner

Primary Examiner—James J. Seidleck
Assistant Examiner—Travis B Ribar
(74) Attorney, Agent, or Firm—Hitt Gaines, PC

(57) ABSTRACT

The present invention is directed, in general, to a polymer with altered properties to make the pad more suitable for use in customized semiconductor, in particular, shallow trench isolation chemical mechanical polishing applications. A method of preparing such polymers comprises exposing a plastic substrate to a supercritical fluid containing a precursor. By virtue of the reactive environment provided by the supercritical fluid, the precursor is grafted throughout the plastic, thereby changing its bulk properties. A wide variety of grafted compounds, including inorganic, wetability and inorganic-organic compounds, may thus be incorporated into the plastic to form a new polymer endowed with new set of favorable polishing properties.

16 Claims, 2 Drawing Sheets

METHOD OF INTRODUCING ORGANIC AND INORGANIC GRAFTED COMPOUNDS THROUGHOUT A THERMOPLASTIC POLISHING PAD USING A SUPERCRITICAL FLUID AND APPLICATIONS THEREFOR

CROSS-REFERENCE TO PROVISIONAL APPLICATION

This application claims the benefit of U.S. Provisional Apppication No. 60/250,299 entitled, "SUBSTRATE POLISHING DEVICE AND METHOD," to Edward M. Yokley, filed on Nov. 29, 2000; U.S. Provisional Application No. 60/295,315 entitled, "A METHOD OF ALTERING PROPERTIES OF A POLISHING PAD AND SPECIFIC APPLICATIONS THEREFOR," to Yaw S. Obeng and Edward M. Yokley, filed on Jun. 1, 2001; and U.S. Provisional Application No. 60/304,375 entitled, "A METHOD OF ALTERING PROPERTIES OF A THERMOPLASTIC FOAM POLISHING PAD AND SPECIFIC APPLICATIONS THEREFOR," to Yaw S. Obeng and Edward M. Yokley, filed on Jul. 10, 2001, which are commonly assigned with the present invention and incorporated herein by reference as if reproduced herein in its entirety.

TECHNICAL FIELD OF THE INVENTION

The present invention is directed to polishing pads used for creating a smooth, ultra-flat surface on such items as glass, semiconductors, dielectric/metal composites, magnetic mass storage media and integrated circuits. More specifically, the present invention relates to introducing an organic or inorganic coating throughout a thermoplastic pad using a supercritical fluid, thereby creating more suitable polishing pads.

BACKGROUND OF THE INVENTION

Chemical-mechanical polishing (CMP)is used extensively as a planarizing technique in the manufacture of VLSI integrated circuits. It has potential for planarizing a variety of materials in IC processing, but is used most widely for planarizing metallizied layers and interlevel dielectrics on semiconductor wafers, and for planarizing substrates for shallow trench isolation.

In trench isolation, for example, large areas of field oxide must be polished to produce a planar starting wafer. Integrated circuits that operate with low voltages, i.e., 5 volts or less, and with shallow junctions, can be isolated effectively with relatively shallow trenches, i.e., less than a micron. In shallow trench isolation (STI) technology, the trench is backfilled with oxide and the wafer is planarized using CMP. The result is a more planar structure than typically obtained using LOCOS, and the deeper trench (as compared with LOCOS) provides superior latch up immunity. Also, by comparison with LOCOS, STI substrates have a much reduced "birds' beak" effect and thus theoretically provide higher packing density for circuit elements on the chips. The drawbacks in STI technology to date relate mostly to the planarizing process. Achieving acceptable planarization across the full diameter of a wafer using traditional etching processes has been largely unsuccessful. By using CMP, where the wafer is polished using a mechanical polishing wheel and a slurry of chemical etchant, unwanted oxide material is removed with a high degree of planarity.

Similarly, integrated circuit fabrication on semiconductor wafers require the formation of precisely controlled apertures, such as contact openings or "vias," that are subsequently filled and interconnected to create components and very large scale integration (VLSI) or ultra large scale integration (ULSI) circuits. Equally well known is that the patterns defining such openings are typically created by optical lithographic processes that require precise alignment with prior levels to accurately contact the active devices located in those prior levels. In multilevel metallization processes, each level in the multilevel structure contributes to irregular topography. In three or four level metal processes, the topography can be especially severe and complex. The expedient of planarizing the interlevel dielectric layers, as the process proceeds, is now favored in many state of the art IC processes. Planarity in the metal layers is a common objective, and is promoted by using plug interlevel connections. A preferred approach to plug formation is to blanket deposit a thick metal layer on the interlevel dielectric and into the interlevel windows, and then remove the excess using CMP. In a typical case, CMP is used for polishing an oxide, such as $SiO_2$, $Ta_2O_5$, $W_2O_5$. It can also be used to polish nitrides such as $SI_3N_4$, TaN, TiN, and conductor materials used for interlevel plugs, such as W, Ti, TiN.

CMP generally consists of the controlled wearing of a rough surface to produce a smooth specular finished surface. This is commonly accomplished by rubbing a pad against the surface of the article, or workpiece, to be polished in a repetitive, regular motion while a slurry containing a suspension of fine particles is present at the interface between the polishing pad and the workpiece. Commonly employed pads are made from felted or woven natural fibers such as wool, urethane-impregnated felted polyester or various types of filled polyurethane plastic.

A CMP pad ideally is flat, uniform across its entire surface, resistant to the chemical nature of the slurry and have the right combination of stiffness and compressibility to minimize effects like dishing and erosion. In particular, there is a direct correlation between lowering Von Mises stress distributions in the pad and improving polishing pad removal rates and uniformity. In turn, Von Mises stresses may be reduced though the controlled production of pad materials of uniform constitution, as governed by the chemical-mechanical properties of the pad material.

CMP pad performance optimization has traditionally involved the empirical selection of materials and use of macro fabrication technologies. For example, a pad possessing preexisting desirable porosity or surface texture properties may be able to absorb particulate matter such as silica or other abrasive materials. Or, patterns of flow channels cut into the surface of polishing pads may improve slurry flow across the workpiece surface. The reduction in the contact surface area effected by patterning also provides higher contact pressures during polishing, further enhancing the polishing rate.

Alternatively, intrinsic microtextures may be introduced into pad surfaces by using composite or multilayer materials possessing favorable surface textures as byproduct of their method of manufacture. Favorable surface microtextures may also be present by virtue of bulk non-uniformities introduced during the manufacturing process. When cross-sectioned, abraded, or otherwise exposed, these bulk non-uniformities become favorable surface microtextures. Such inherent microtextures, present prior to use, may permit the absorption and transport of slurry particles, thereby providing enhanced polishing activity without the need to further add micro-or macrotextures.

There are, however, several deficiencies in polishing pad materials selected or produced according to the above-described empirical techniques. Pads made of layers of polymer material may have thermal insulating properties, and therefore unable conduct heat away from the polishing surface, resulting in undesirable heating during polishing. Numerous virgin homogenous sheets of polymers such as polyurethane, polycarbonate, nylon, polyureas, felt, or polyester, have poor inherent polishing ability, and hence not used as polishing pads. In certain instances, mechanical or chemical texturing may transform these materials, thereby rendering them useful in polishing. Such pad surfaces, however, may require periodic reconditioning.

Polyurethane based pads for example, currently in widespread use, are decomposed by the chemically aggressive processing slurries by virtue of the inherent chemical nature of urethane. This decomposition produces a surface modification in and of itself in the case of the polyurethane pads. Such pads require reconditioning, and thus reduce the productivity and increase the cost of the polishing process.

Yet another approach involves modifying the surface of CMP polishing pads materials to improve for example, the wetability of the pad surface, the adhesion of surface coatings, and the application performance of these materials. Plasma treatment of polishing pad materials, for example, is one means to functionalize and thereby modify polishing pad surfaces. However, the simple functionalization of pad surfaces by plasma treatment is known to be a temporary effect, with spontaneous loss of functionalization after one to two days. While some success in the preservation of functionalized pad surfaces has been obtained for some fluorinated polymeric surfaces, this has not been demonstrated for other polymeric surfaces, and in particular, thermoplastics. Such modified surfaces may thus require periodic pad refunctionalization, or pad replacement.

Accordingly, what is needed in the art is an improved process for modifying a semiconductor wafer plastic polishing pad, thereby providing a rapid rate of polishing, but reducing the need for pad reconditioning and refunctionalization following a period chemical/mechanical planarization.

SUMMARY OF THE INVENTION

To address the deficiencies of the prior art, the present invention, in one embodiment, provides a polymer comprising a plastic substrate having a grafted compound located substantially throughout the plastic.

In another embodiment, the present invention provides a method for preparing a polymer that includes providing a plastic substrate and exposing the plastic substrate to a precursor in a supercritical fluid to thereby produce a modified plastic.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
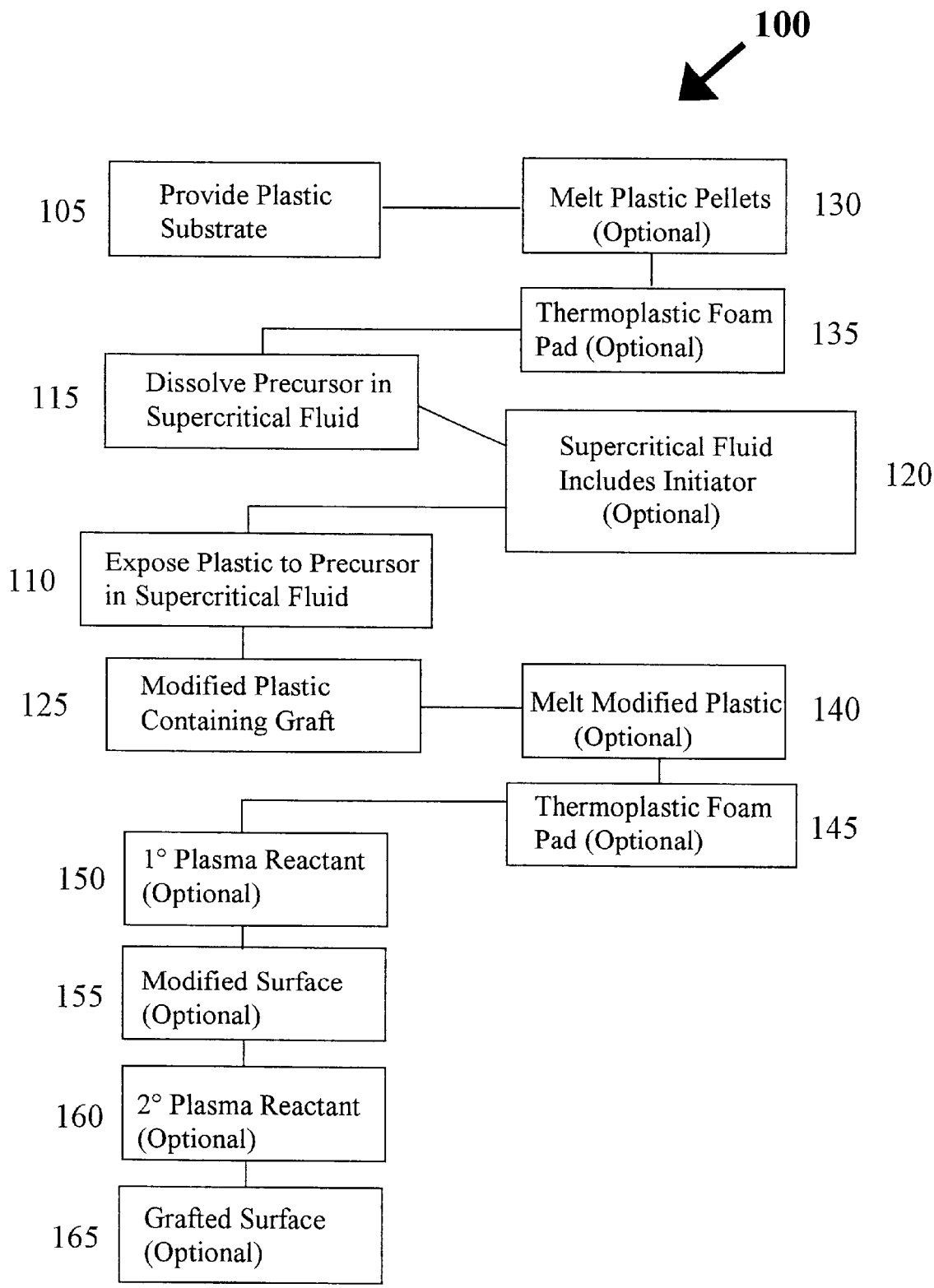
FIG. 1 illustrates a method for preparing a polymer according to the present invention.

The present invention is directed to a polishing pad made from an extruded and formed polymer where the polymer is made by treatment of a plastic substrate with a precursor compound dissolved in a supercritical fluid. The resulting polymer, when serving as a polishing pad, has an improved distribution of the chemically reactive or abrasive slurry on the surface of the pad, or other favorable porosity or surface texture properties. As they are well known, supercritical fluids have physical properties intermediate between gases and liquids. For example, supercritical fluids in general have lower viscosities, densities and diffusivities compared to liquids. Such properties may provide optimal conditions for enhancing certain chemical reactions and processes. Moreover, such physical properties, by virtue of their sensitivity to both pressure and temperature offers greater control over the conditions under which chemical reactions may proceed. In the case of a pre-formed foam, for example, the high solubility if the supercritical fluid in the foam matrix allows the penetration of the dissolved monomer into the interior of the cell structure of the foam. Alternatively, in the case of manufacturing the foam, here the supercritical fluid is the blowing agent for the foam. In this case, the monomers are carried directly onto the surfaces of the interior cell structure as the foam is being manufactured.

In the present invention, a precursor, comprising a grafted compound further described below, may be dissolved in a super critical fluid. The fluid mixture may then be introduced to a plastic substrate. Though not limiting the scope of the invention by theory, it is believed that a supercritical fluid swells the matrix of the plastic substrate. This in turn may facilitate permeation of the precursor throughout the plastic. The supercritical fluid also may provide a highly reactive environment for precursor decomposition and crosslinking and incorporation into the plastic matrix. The incorporation of the precursor into the plastic matrix to form a modified plastic is designated as grafting, and the precursor after attachment to the plastic is designated as a grafted compound. Moreover, the reaction between the precursor and the plastic may be enhanced on exposure of plastic substrate to an initiator included in the supercritical fluid environment. For example, when the precursor is an inorganic compound, water is the preferred initiator, serving as a crosslinker. When the precursor is an organic compound, an azo or peroxide initiator is preferred. Or when the precursor is a controlled wetability compound and the polymer substrate is preferably in a foam configuration, an initiator may not be required.

Once the polymer is thus formed, it may be further processed to provide any number of useful polishing pad configurations in CMP applications. In one advantageous embodiment, the polymer, after the above reaction, may be melted and extruded to form a polishing pad. Equipment for conventional thermoplastic extrusion is well-known in the art and may be available, for example, from Drexel, Inc. (Weyburn, MA). In other embodiments, the polymer may be foamed by conventional processes to produce a thermoplastic foam. In such embodiments, the grafted compound is introduced into the plastic substrate via the supercritical fluid such that the grafted compound permeates the entire foam body, including for example, interior walls of a closed-shell foam structure. A method of preparing a polishing pad may therefore include the steps discussed above, as well as a polishing apparatus.

Thus, the polymer of the present invention comprises a plastic substrate having a grafted compound located substantially throughout the plastic. Such polymers are particularly useful in CMP processes due to the introduction of grafted compounds comprising, for example, a very fine hard material throughout the plastic substrate, which is then incorporated into a polishing pad. Such pads may enable the use of reduced or non-abrasive slurries, which may improve thermal management. Additionally, grafted compounds introduced via the supercritical fluid process produce thermoplastic foam polymers with certain desirable physical and chemical properties, such as controlled wetability throughout the polymer, including its surface, and rendering such surfaces permanent.

In certain preferred embodiments, the plastic substrate may be composed of polyurethane, polyolefin or polyvinyl ester. Alternative embodiments of the plastic substrate may be, for example, polyurea, polycarbonate, aliphatic polyketone, polysulfone, aromatic polyketone, 6,6 nylon, 6,12 nylon or polyamide. In other preferred embodiments, the substrate may be thermoplastic rubber or melt-processible rubber. However, embodiments where the substrate is composed of closed-cell polypropylene, polyethylene, crosslinked polyethylene, ethylene vinyl acetate, or polyvinylacetate are also within the scope of the present invention.

The surface of the polymer produced as described above may be further modified to improve the selectivity and performance of polishing pads formed from the polymer. For example, an embodiment comprising a thermoplastic foam substrate, comprising the above described polymer, may be have a modified surface and a grafted surface on the modified surface. This polymer is produced, for example, by subjecting the thermoplastic foam substrate to a first plasma treatment to produce a modified surface. The methods and processes for producing such modified surface are more fully described in U.S. Provisional Application No. 60/295,315, incorporated herein by reference. The excited state sites generated by exposing polymers, such as thermoplastic foam polymers, to the initial plasma reactant are thought to provide an attractive base on which to selectively graft numerous inorganic and organic materials. Such material may include the same groups of precursor compounds dissolved in the supercritical fluid, as further described below. This allows the grafting of various functional groups onto the polymer's modified surface in a second plasma treatment. Such thermoplastic foam polymers may thus contain grafted functional groups that change the nanoscale morphology of a pad surface, while leaving the bulk properties of the supercritical fluid treated polymer relatively intact. Such surface modified polymers of the present invention may have enhanced selectivity for certain CMP applications.

One group of grafted compound may include oxygen-containing organometallic reactants that incorporate an inorganic metal oxide throughout the plastic. In such embodiments, the precursors typically include a transition metal, such as titanium, manganese, or tantalum. However, any metal element capable of forming an oxygen containing organometallic compound, being dissolved in a supercritical fluid and capable of being incorporated into the plastic substrate is suitable. Silicon may also be employed as the metal portion of the organometallic precursor reagent. In these embodiments, the organic portion of the organometallic reagent may be an ester, acetate, or alkoxy fragment. The precursor reagent may optionally include ozone, alkoxy silanes, water, ammonia, alcohols, mineral sprits or hydrogen peroxide. For example, in preferred embodiments, the grafted compound may be formed from precursors composed of titanium esters, tantalum alkoxides, including tantalum alkoxides wherein the alkoxide portion has 1–5 carbon atoms; manganese acetate solution in water; manganese alkoxide dissolved in mineral spirits; manganese acetate; manganese acetylacetonate; aluminum alkoxides; alkoxy aluminates; zirconium alkoxides, wherein the alkoxide has 1–5 carbon atoms; alkoxy zirconates; magnesium acetate; and magnesium acetylacetonate. Other embodiments are also contemplated for the grafted compound being formed from precursors composed of, for example, alkoxy silanes and ozone, alkoxy silanes and ammonia, titanium esters and water, titanium esters and alcohols, or titanium esters and ozone.

Another group of grafted compounds may be super hydrated, for imparting controlled wetability and designed alkalinity properties. In such instances, the plastic substrate has preferably already being foamed, for example, by using a supercritical fluid as a foaming agent. Thus, the polymer has a foam structure and the grafted compound includes a controlled wetability compound. As noted above, in such instances an initiator may not be required. In preferred embodiments, the grafted compounds may be formed from precursors composed of water, aliphatic alcohols, or aliphatic polyalcohols. In other embodiments, the grafted compounds may be formed from precursors composed of hydrogen peroxide, ammonia, or oxides of nitrogen. Yet other embodiments include hydroxylamine solution, hydrazine, sulfur hexafluoride as the precursor. One skilled in the art, however, will recognize that other similar materials, including other organic alcohols or polyalcohols, may produce the desired properties when grafted into the polymer, and thus, are within the scope of the present invention.

Yet another group of grafted compounds may include organic compounds. For example, in preferred embodiments, the grafted compounds may be formed from precursors composed of allyl alcohols; allyl amines; allyl alkylamines, where the alkyl groups contain 1–8 carbon atoms; allyl ethers; secondary amines, where the alkyl groups contain 1–8 carbon; alkyl hydrazines, where the alkyl groups contain 1–8 carbon atoms; acrylic acid; methacrylic acid; acrylic acid esters containing 1–8 carbon atoms; methacrylic esters containing 1–8 carbon atoms; or vinyl pyridine, and vinyl esters, for example, vinyl acetate.

FIG. 1 illustrates a method for preparing the polymer of the present invention. The method 100 for preparing a plastic comprises providing a plastic substrate, at step 105, for example, one or more of the above mentioned plastics. Next the plastic is exposed to a precursor, at step 110. For example, one or more of the above mentioned precursor compounds, may be dissolved in a supercritical fluid, 115, to produce a modified plastic at step 125. A conventional apparatus and method may be used to produce the supercritical fluid of the present invention. Moreover, the specific combination of temperature and pressure required to produce a supercritical fluid are known to those of ordinary skill in the art. In one preferred embodiment, plastic is exposed to a supercritical fluid at step 115, preferably including carbon dioxide, although other supercritical fluids are within the scope of the present invention. Alternatively, the supercritical fluid may include nitrogen ($N_2$). When carbon dioxide is used, cosolvents, such as 0–10% aliphatic alcohol or aliphatic amide are preferably included as co-solvents to modify the solubility of the carbon dioxide supercritical fluid. In other embodiments, an initiator, at step 120, is included with the supercritical fluid 115, to facilitate incorporation of the precursor, 110, into the plastic and thereby form a grafted compound in the modified plastic, 125. As noted above, the initiator is preferably water, when using inorganic compounds as the precursor. Alternatively, when using organic compounds as the precursor, initiators such as azo compounds, e.g., azobisisobutyronitrile (AIBN), or peroxides, e.g., t-butyl hydroperoxide, are preferred. The azo or precursor initiators, are preferably 0.001 to 1% by weight. To provide an example, the provided plastic substrate, 105, may be soaked in a carbon dioxide supercritical fluid, 115, containing water as a co-solvent, 120, and the inorganic metal oxide precursor tetraethoxy silane (TEOS), 110. As the supercritical fluid swells the plastic, the inorganic material is incorporated into the bulk and then in the presence of water, the precursor is hydrolyzed, and silica is incorporated into the bulk of the plastic to form a modified silica-laden plastic, 125, with the ethoxy groups from TEOS remaining in the matrix.

Polishing pads in certain embodiments of the present invention may be manufactured by first melting, at step 130, thermoplastic polymer pellets in a melt extrusion apparatus. Conventional techniques are used to blow gas into the melt to produce a foam and then form a thermoplastic foam pad, at step 135, for example by laser cutting or die cutting. The plastic substrate, 105, provided in the form of a thermoplastic foam pad, 135, is then exposed to a precursor, 110, dissolved in a supercritical fluid, 115, to thereby produce a modified plastic, 120. Alternatively, in certain embodiments, the polymer of the present invention may be first produced by providing a plastic substrate, 105, and exposing the plastic substrate to a precursor, 110, dissolved in a supercritical fluid, 115, to thereby produce a modified plastic, 125. Subsequently, the polymer is melted, at step 140, and then foamed and formed into pads at step 145, analogous to that described above.

In alternative embodiments, the method of preparing the polymer may further include exposing the modified plastic to an initial plasma reactant, at step 150, to create a modified surface thereon, at step 155. The plastic is then exposed to a secondary plasma reactant, at step 160, including any of the precursor compounds described above, to thereby create a grafted surface, at step 165, on the modified surface. Continuing with the same example, the silica-laden plastic, 125, may be exposed to a primary plasma reactant, 150, such as Helium, to create a modified surface 155. The modified surface 155 of the silica laden plastic 125 may then be further exposed to a secondary plasma reactant, such as an allyl amine, 160, to create a grafted surface, 165, on the modified surface. The resulting polymer thus has its bulk properties modified, for example making its surface harder and more hydrophilic by virtue of the above describe supercritical fluid treatment. This in turn raises the polishing rate of oxides. Moreover, the polymers surface properties modified, for example, improved selectivity for polishing copper, by virtue of the above describe plasma treatment.

Figure 2:
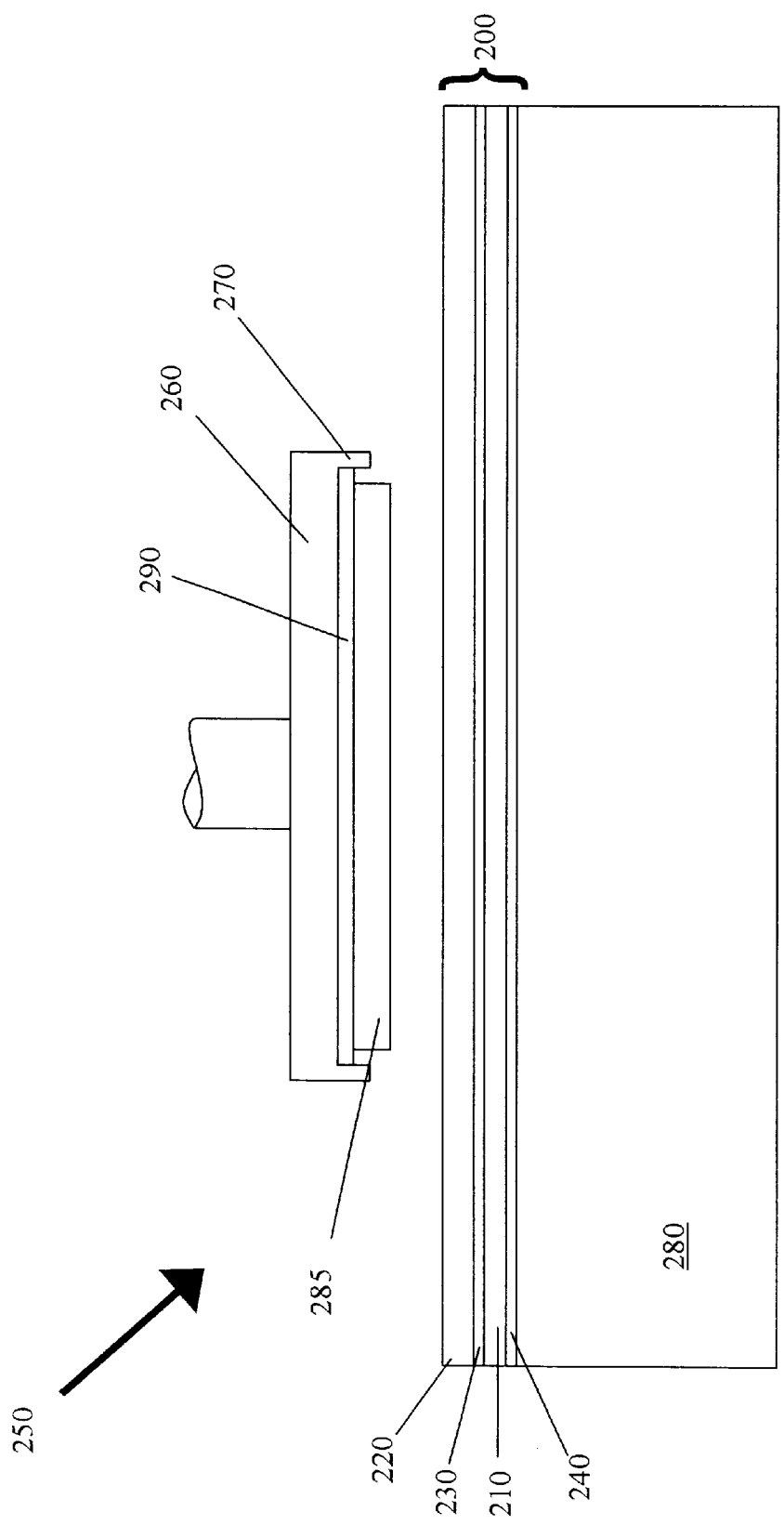
FIG. 2 illustrates a polishing apparatus, including a polishing pad fabricated using a thermoplastic foam polymer made according to the present invention.

Polishing pads fabricated from the polymer of the present invention may be employed in a variety of CMP polishing apparatus 250, one embodiment of which is displayed in FIG. 2. The thermoplastic foam polymers of the present invention may be incorporated into a polishing body 200 that includes a base pad 210, where a thermoplastic foam polymer 220 forms a polishing surface located over the base pad 210. Optionally, a first adhesive material 230, such as acrylate-based, silicone-based, epoxy or other materials well known to those skilled in the art, may be used to couple the base pad 210 to the thermoplastic foam polymers 220. The resulting polishing pads may also have a second conventional adhesive material 240 applied to the platen side. The polishing pad may then be cleaned and packaged for use.

With continuing reference to FIG. 2, the polishing body 200 may then be employed in a variety of CMP processes by incorporating it into a polishing apparatus 250. The polishing apparatus 250 typically includes a conventional mechanically driven carrier head 260, a conventional carrier ring 270, a conventional polishing platen 280, and the polishing body 200 comprising the thermoplastic foam polymer 220 of the present invention. The polishing body 200 may be attached to the polishing platen 280 by using the second adhesive 240, if so desired. The substrate to be polished 285, typically a wafer, may be attached to the carrier ring with the aid of a third a conventional adhesive 290. The carrier head 260 is then positioned against the polishing platen 280 to impart a polishing force against the polishing platen 280. The substrate to be polished 285 is most often polished by an appropriate conventional slurry mixture that is dispensed on the polishing body 200. Optionally, as mentioned above, the slurry may be omitted.

With continuing reference to FIG. 2, in such polishing processes, a substrate 285 may be polished by positioning the substrate 285, having at least one layer, on to the above-described polishing apparatus 250, and polishing the layer against the thermoplastic foam polymer 220. In one embodiment, the substrate 285 has at least one layer of material that is a metal layer. In particular embodiments, the metal layer may be copper or tungsten. In another embodiment, the substrate 285 may be silicon, polysilicon or dielectric material located on a semiconductor wafer. Thermoplastic foam polymers 220 of the present invention are particularly suited for polishing in shallow trench isolation (STI), interlevel dielectrics, and metal interconnects in integrated circuit fabrication or other fabrication techniques where large areas of field oxide, other dielectrics or metal must be removed from the wafer to produce a planar surface prior to subsequent processing. The thermoplastic foam polymers 220 of the present invention are also desirable for polishing metalization materials such as W, Ti, Cu, Al, and other metals as well as nitrides or barrier materials such as $Si_3 N_4$, TaN, TiN.

The polishing pads provided by the present invention may then be fabricated by melt extrusion of the pellets into sheets, and the pads made by laser cutting, die cutting or by a similar conventional process. The round plastic sheets may then have an adhesive applied to the platen side, after which they are modified by exposure to the supercritical fluid as discussed above, cleaned and packaged for use.

Although the present invention has been described in detail, those skilled in the art should understand that they can make various changes, substitutions and alterations herein without departing from the spirit and scope of the invention in its broadest form.

What is claimed is:

1. A polishing pad made by the process comprising:
   providing a plastic substrate;
   exposing said plastic substrate to a precursor dissolved in a supercritical fluid to form a grafted compound located substantially throughout said plastic substrate.

2. The polishing pad as recited in claim 1, wherein said plastic substrate is a thermoplastic foam.

3. The polishing pad as recited in claim 1, wherein said plastic substrate is selected from the group consisting of:

polyurethane;

polyolefin; and polyvinyl esters.

4. The polishing pad as recited in claim 1, wherein said plastic substrate is selected from the group consisting of:

polyurea;

polycarbonate;

aliphatic polyketone;

polysul fone;

aromatic polyketone;

6,6 nylon;

6,12 nylon; and polyamide.

5. The polishing pad as recited in claim 1, wherein said plastic substrate is selected from the group consisting of:

thermoplastic rubber; and melt-processible rubber.

6. The polishing pad as recited in claim 1, wherein said plastic substrate is selected from the group consisting of:

polypropylene;

polyethylene;

crosslinked polyethylene;

ethylene vinyl acetate; and polyvinylacetate.

7. The polishing pad as recited in claim 1, wherein said plastic substrate has a modified surface and a grafted surface on said modified surface.

8. The polishing pad as recited in claim 1, wherein said grafted compound includes an inorganic metal oxide.

9. The polishing pad as recited in claim 8, wherein said inorganic metal oxide is formed from a precursor selected from a group of consisting of:

titanium esters;

tantalum alkoxides;

manganese acetate;

manganese alkoxide;

manganese acetylacetonate;

aluminum alkoxides;

alkoxy aluminates;

zirconium alkoxides;

alkoxy zirconates;

magnesium acetate; and magnesium acetylacetonate.

10. The polishing pad as recited in claim 8, wherein said inorganic metal oxide is formed from a precursor selected from a group of consisting of:

titanium esters plus water;

titanium esters plus alcohols;

titanium esters plus ozone;

alkoxy silanes plus ozone; and alkoxy silanes plus ammonia.

11. The polishing pad as recited in claim 1, wherein said plastic substrate has a foam structure and said grafted compound includes a controlled wetability compound.

12. The polishing pad as recited in claim 11, wherein said controlled wetability compound is formed from a precursor selected from a group of consisting of:

water;

aliphatic alcohols; and aliphatic polyalcohols.

13. The polishing pad as recited in claim 11, wherein said controlled wetability compound is formed from a precursor selected from a group of consisting of:

hydrogen peroxide;

ammonia; and oxides of nitrogen.

14. The polishing pad as recited in claim 11, wherein said controlled wetability compound is formed from a precursor selected from a group consisting of:

hydroxylamine solution; and sulfur hexafluoride.

15. The polishing pad as recited in claim 1, wherein said grafted compound includes an organic compound.

16. The polishing pad as recited in claim 15, wherein said organic compound is formed from a precursor selected from a group consisting of:

allyl alcohols;

allyl amines;

allyl alkylamines, where the alkyl groups contain 1–8 carbon atoms;

allyl ethers;

secondary amines, where the alkyl groups contain 1–8 carbon atoms;

alkyl hydrazines, where the alkyl groups contain 1–8 carbon atoms;

acrylic acid;

methacrylic acid;

acrylic acid esters containing 1–8 carbon;

methacrylic esters containing 1–8 carbon;

vinyl pyridine;

vinyl esters.

* * * * *